July 25, 1967  J. J. KNOX  3,332,764

METHOD OF SHRINKING GLASS TUBING

Filed Nov. 2, 1964  3 Sheets-Sheet 1

INVENTOR.
James J. Knox,
BY Richards & Cifelli,
Attorneys

July 25, 1967 J. J. KNOX 3,332,764
METHOD OF SHRINKING GLASS TUBING
Filed Nov. 2, 1964 3 Sheets-Sheet 2
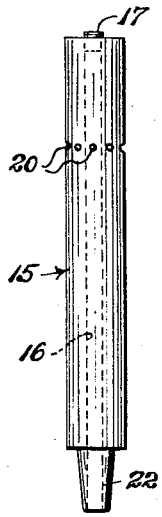
Fig.3
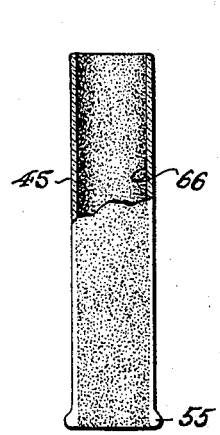
Fig.4
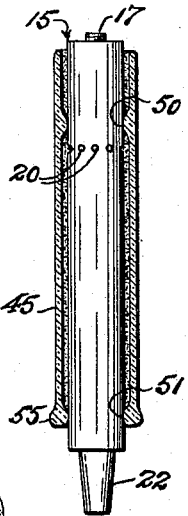
Fig.6
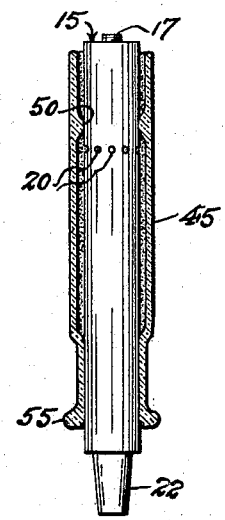
Fig.7
Fig.5
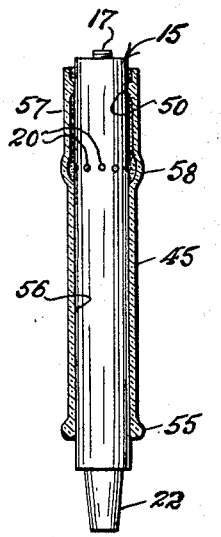
Fig.8
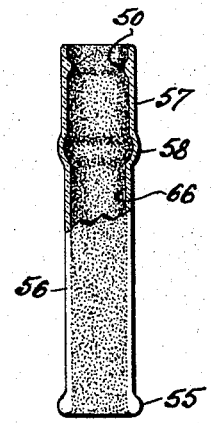
Fig.9
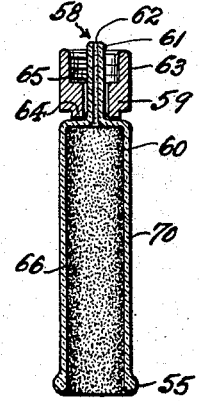
Fig.11
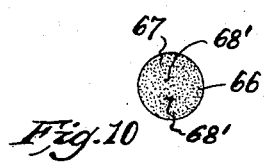
Fig.10
INVENTOR.
James J. Knox,
BY Richards & Gifelli,
Attorneys

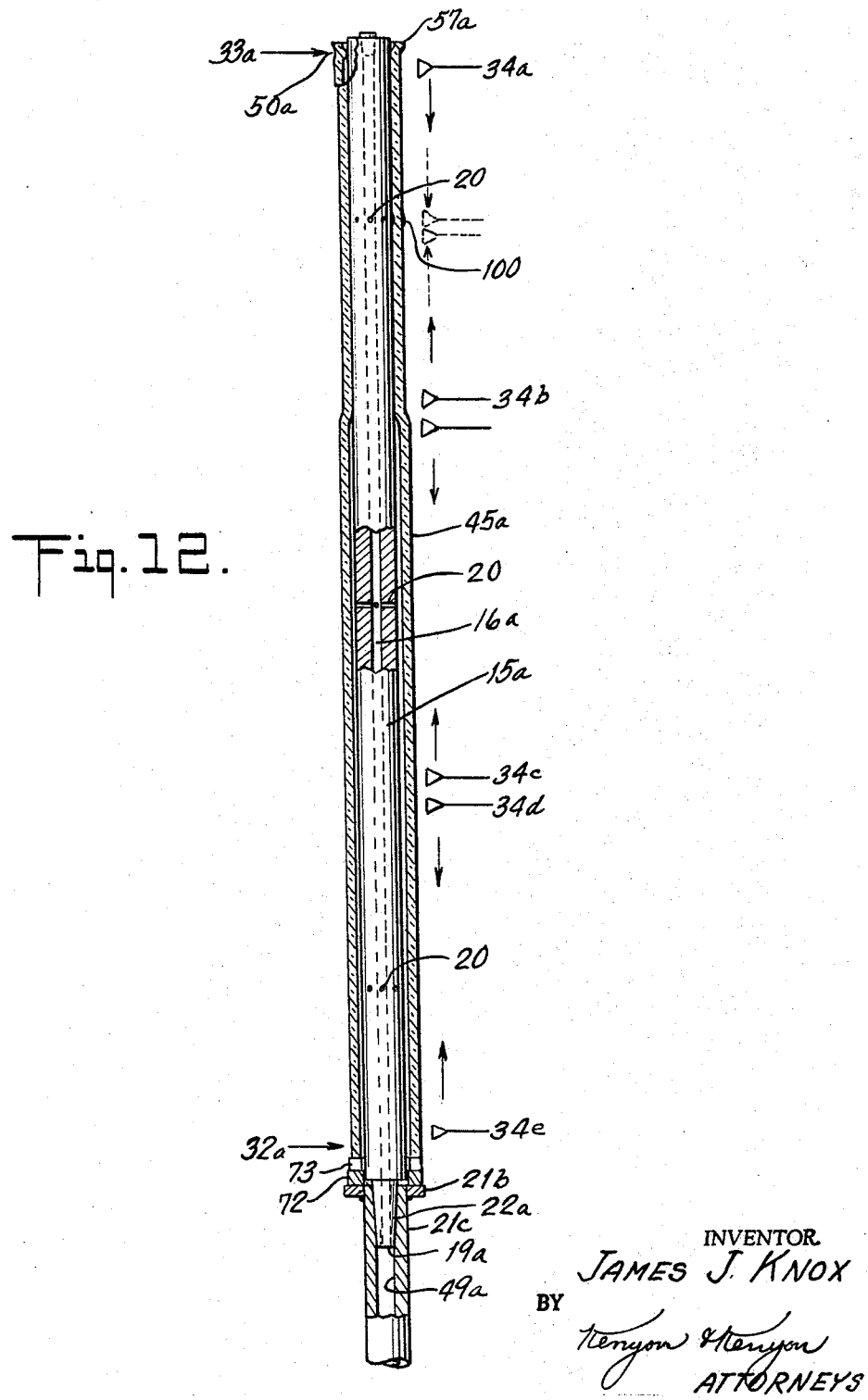

United States Patent Office 3,332,764
Patented July 25, 1967

3,332,764
METHOD OF SHRINKING GLASS TUBING
James J. Knox, Avenel, N.J., assignor to Knox Laboratories, Inc., Rahway, N.J., a corporation of New Jersey
Filed Nov. 2, 1964, Ser. No. 409,352
8 Claims. (Cl. 65—109)

This application is a continuation-in-part of application Ser. No. 831,627 filed Aug. 4, 1959, now abandoned, by James J. Knox.

This invention is for a method and apparatus for dimensioning the bores of lengths of drawn glass tubing to extremely accurate tolerances. More particularly, it relates to improvements in the art of shrinking glass tubing for use in hypodermic syringe manufacture.

The manufacture of hypodermic syringes requires a fit between a glass barrel and a glass piston such that the piston may be moved throughout the length of the barrel with a smooth easy frictional resistance. If portions of the circumference along the barrel are too small or if the barrel is not perfectly round, the piston will bind, the movement of the piston will be jerky; if it is too large, the air-tight seal between barrel and piston will not be maintained. It should be understood that this air-tight seal must be maintained by accurate tolerances alone and that lubricating oil or the like cannot be used because it might contaminate the medication and for other reasons. Moreover, the glass bore must be absolutely smooth. If there are small surface imperfections, the plunger will abrade them from the surface as microscopic pieces of glass which may contaminate the medication and be injected with it into the person receiving treatment.

The accuracy and success of other medical and scientific procedures also depend on the accuracy of a glass tube measuring or metering device.

The tubing that is used in syringe manufacture is drawn to a nominal size but, despite the best efforts of those skilled in that art, it will have variations of internal diameter in the order of magnitude of 20,000 $10^{-6}$ inches, with variations of 10,000 $10^{-6}$ inches occurring within intervals of several feet. These variations of 1 to 2 hundredths of an inch may be insignificant for many purposes, but after the tubing has been made into a syringe barrel (including a tip at one end and a flange around the other) these variations appear enormous.

Until recently, each syringe barrel had to be hand ground on a mandrel to provide a sufficiently uniform surface and bore. In the process, the diameter could not be controlled and an individual plunger had to be fitted and actually lapped with a fine abrasive into the barrel to be mated with it. This method of grinding a syringe has been well known for years and, even though the plunger has to be custom made and fitted, tolerances in the order of 390 $10^{-6}$ inches can be achieved.

Rather than mating these ground barrels individually with plungers, a British Patent No. 545,140 to Everett teaches that they can be stretched slightly to an exact uniform size, for example, by placing a metal mandrel inside a barrel while it is cold, and then placing the combination in a furnace to cause it to expand. The mandrel is described as expanding more than the barrel so as to stretch the barrel.

Also, it has been known to shrink the tubular portion of a glass container-like syringe barrel (including a closing tip) by placing it over a mandrel, heating it to a viscous flow condition, and then by application of pressure causing the glass barrel to conform to the mandrel. The tip portion closes off one end of the tube, and a closure is made between the mandrel and the open end of the syringe barrel. More generally, the Patent No. 2,470,234 issued to Brewer on May 17, 1949 shows how to shrink glass tubing open at both ends by fitting one end with a temporary cap or plug to make it into a closed container that can be put over a mandrel. Shrinking glass over a mandrel has been used to shape other glass containers, like electric discharge tube envelopes as described in British Patent No. 782,141.

One disadvantage with the practice of shrinking a syringe barrel and tip combination is that the tip, which serves to close one end of the syringe must be made large in diameter and of considerable mass to provide sufficient strength and heat inertia to avoid damage to it during the application of heat and pressure in the shrinking process. A second disadvantage is that a bulge is formed in the syringe barrel adjacent to the tip because the present method requires shrinking to commence at the flange end of the syringe and move toward the tip end of the syringe and this causes a gradual flow of glass toward the tip end which results in the bulge at the end of the shrinking process.

Another problem of shrinking has been that the drawn glass tubing as supplied for syringe manufacture has small surface imperfections. Unfortunately, the number and size of these imperfections are increased by the shrinking process. It has been discovered that if the tubing bore is slightly abraded before the shrinking process to give it a dull finish, the subsequent shrinking will reduce the surface imperfections instead of increasing them. The surface abrasion need not be to any tolerance and it does not need to remove the surface imperfections in order for there to be a subsequent improvement in the quality during the shrinking; treating the surface by abrasion is sufficient.

It is an object of the present invention to shrink lengths of glass tubing open at each end so that the tubing may be dimensioned uniformly throughout its length and a syringe tip formed thereafter.

It is a further object of the present invention to provide for shrinking the glass tubing in long lengths, to permit the flow of glass in the shrinking process toward either or both ends of the tubing, and to permit shrinking tubing over the entire length of a mandrel and even over the air evacuation passageways.

It is a further object of the present invention to provide for the reduction of surface imperfections during the shrinking process.

It is a further object of the present invention to provide improved shrinking apparatus and methods for its manufacture.

In brief, and according to one example of the present invention, an accurately sized mandrel for shrinking glass is provided. Along the surface of the mandrel, openings are provided which connect through passageways to a bore and means for evacuating air through the openings. A plurality of small openings rather than several large ones are provided.

A length of drawn glass tubing is then placed over and around the mandrel and a vacuum system connected to the mandrel bore to evacuate air from between the glass tubing and the mandrel surface.

A point of sealing contact is then made between the glass tubing adjacent to each of its ends and the mandrel surface. For convenience these points of sealing contact will be hereinafter referred to as "seals." It should be understood, however, that a permanent glass-to-metal bond is not contemplated by this term. Rather, the glass and metal are in sufficient contact to permit at least a partial vacuum to be drawn in the space between the tube and mandrel and between the end "seals." This flame seal is made by heating the glass tubing substantially above its softening point, or the temperature at which the glass will deform under its own weight, in the area of a ring adjacent the tube end. Under the urging of surface tension and the differential pressure between the still air outside the tube and the moving air between the tube and the mandrel, this ring portion of the glass tube is moved in and against the mandrel to form a seal. With seals formed at each end of the glass tubing, it will be apparent that one seal has been formed on each side of the radial passageways in the mandrel.

The air space between the glass tube and the mandrel between the seals is then partially evacuated and the glass caused to collapse against the mandrel under a soft moving heat source that operates adjacent the seal on the side toward the radial mandrel passageways to cause the glass tube to collapse and then moves slowly toward the area of the passageways. Since this collapse is caused by the considerable differential in pressure between the atmosphere and the evacuated area between tubing and mandrel in the area between the seals, the glass need be heated by the soft travelling flame to only about its softening temperature. This results in a better surface between the glass tube and the mandrel after they have been separated at the conclusion of the shrinking process.

It is to be understood that the tube may be preheated on the onset to relieve stresses and strains that might otherwise be generated and that the tube and mandrel are separated after shrinking by allowing them to cool. The mandrel with a higher coefficient of expansion shrinks away from the glass tubing.

It is a further teaching of the invention to provide passageways in the form of small openings having a diameter not greater than about .028 inch. It has been discovered that glass heated only sufficiently to collapse against the mandrel will not flow into such openings. Moreover, it has been discovered that such deformation as may take place toward said openings in the shrinking process will be reabsorbed into the glass tube if the vacuum is released before the tube cools.

It has also been discovered that the characteristic bulge of glass that forms ahead of the moving softening flame during the shrinking process may be eliminated by moving two flames toward each other to meet over the passageways.

After the tubing has collapsed against the mandrel and while it is still hot, the vacuum is released and then the mandrel cools and separates from the shrunk tubing.

According to the teaching of the present invention, long lengths of tubing may be accurately dimensioned by arranging such a length over a long mandrel provided with a plurality of passageway areas. A pair of moving softening flames are then positioned apart on opposite sides of each of said passageway areas. The two flames of each pair begin moving toward each other along the tube length and toward their passageway area causing the tube to collapse. It should be understood that the other process steps, e.g., forming the seals and evacuating the air intermediate the tubing and the mandrel, remains the same for this method of shrinking long lengths of tubing.

Lengths of tubing shrunk according to the present invention are well suited for making syringes. In particular, the syringe barrel can be formed of the tubing using the precisely shrunk portion to make the barrel portion of the syringe and forming the needle-mounting tip out of the end of the glass tubing which was not shrunk and which includes the flame seal to mandrel. The tip can be made of any size and shape since the tip is not utilized in the shrinking operation.

Preferably the invention is practiced with lengths of tubing abraded on the inside surface. Surface imperfections (such as those mentioned in the Magash et al. Patent 2,736,992) are thus reduced in number and size during the shrinking process; in contrast, they are increased when glass is shrunk without such abrading.

The invention is described in further detail below with reference to the accompanying drawings in which:

FIG. 3 is a view of one mandrel according to the invention;

FIG. 4 is a view of a tube blank having a frost appearing inside surface resulting from abrading the inside surface with gas propelled particles;

FIG. 5 depicts a microscopic view of the inside surface of the tube blank of FIG. 4 and is for comparison with FIG. 10 which is a corresponding view for the tubular piece having a finished section and an unfinished section (FIG. 9), or for the syringe barrel (FIG. 11);

FIGS. 6, 7 and 8 depict a shrinking operation according to the invention;

FIG. 9 shows a tubular piece having a finished section and an unfinished section;

FIG. 10 is as described in the description of FIG. 5;

FIG. 11 depicts the making of a syringe barrel including needle mounting tip from a tubular piece as is shown in FIG. 9;

FIG. 12 shows a mandrel for the shrinking of long lengths of glass tubing, and associated apparatus, with an inset.

Figure 1:
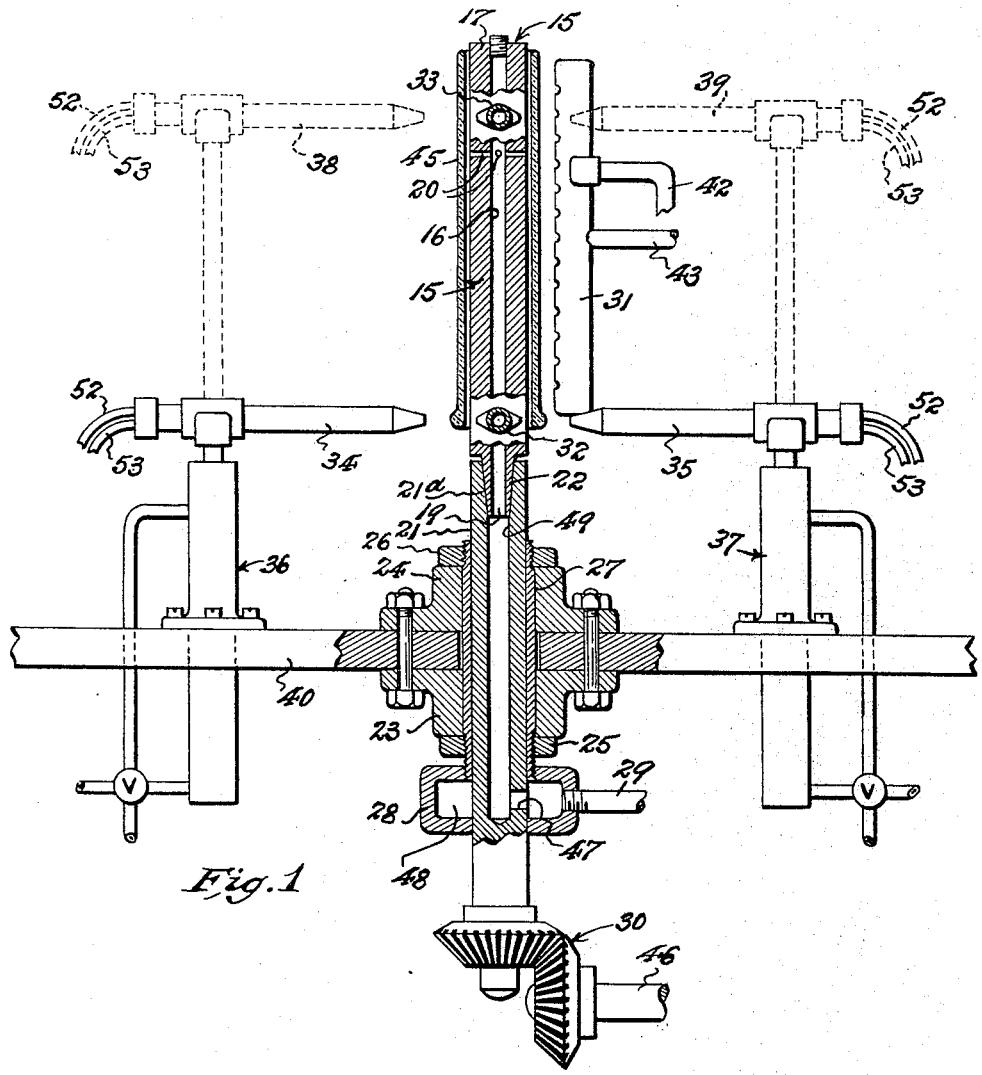
FIG. 1 is an elevation view, partly in section, of one apparatus for practicing the method of the invention.
Figure 2:
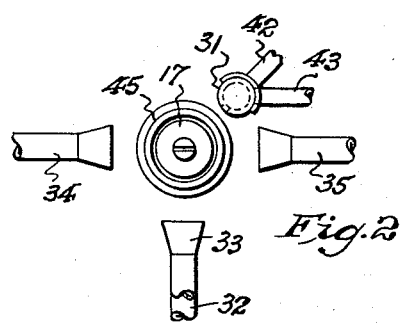
FIG. 2 is a plan view of a part of the apparatus shown in FIG. 1.

The apparatus of the invention includes a cylindrical mandrel 15 having an axially extending bore 16, a closed end 17, an open end 19 and radially extending passageways 20, which extend from the bore 16 to the outer side surface of the mandrel and are positioned intermediate the ends of the mandrel. The mandrel can be stainless steel, or any other substance having suitable high temperature creep resistance and a thermal expansion coefficient larger than that of the glass to be shrunk. A suitable hard-facing alloy such as those of the nickel-chromium-boron type may also be employed to give satisfactory resistance to oxidation. Hard facing alloys of chromium-tungsten-cobalt, chromium-tungsten-boron and nickel, and chromium-molybdenum silicon carbon and iron may also be used as known generally to those skilled in the art. A particularly suitable product is available commercially under the name of "Colmonoy #6" hard-facing alloy which is supplied in a powder form and which may be applied on the base stainless material by spray gun and then machined. The mandrel is mounted on bored shaft 21 for rotation therewith, the mounting being by way of a tapered fit whereby the mandrel tapered end portion 22 is received in the socket 21a of the shaft 21. The shaft 21 is mounted for rotation in bearing sleeve 27 which is secured in place within flanged collars 23 and 24 by lock nuts 25 and 26. The flanged collars are mounted on the work table 40. Power for rotating the bored shaft 21 and mandrel 15 is obtained from drive shaft 46 which is connected to the bored shaft 21 by bevel gearing 30. The bearing sleeve 27 is shaped at its lower end to provide a vacuum box 28 having vacuum chamber 48 and vacuum line 29 which is connected to a vacuum pump (not shown). The bore 49 of bored shaft 21 is communicated with vacuum chamber 48 by radial port 47.

The passageways 20 are preferably made quite small and from about .0135 to not more than .025 inch in diameter so that the softened glass will not flow into the openings. These sizes correspond approximately to drill sizes Nos. 80 to 72 and these dimensions are given for the borosilicate glass as is commonly used in syringe barrel manufacture, e.g. Kimble N51–A.

To the extent that the glass may be deformed slightly into these openings during the shrinking process, the glass so deformed is reabsorbed into the general level of the syringe barrel when the vacuum is removed just after the glass has collapsed and before the glass has cooled. In contradiction to the theory that the tube should be allowed to start to cool while the vacuum is still applied to tend to hold it in place, it is a further teaching of the invention for one embodiment to continue the heating of the glass until, and even after, the vacuum is released to facilitate the reabsorption of these tiny deformities into the uniform inner surface of the tubing.

Although mandrels with a hard surfacing alloy coating are desirable for shrinking, it has proven practically impossible to drill the small holes that are required according to one teaching of the present invention because they must be positioned along the length of the mandrel and in the very area through and over which the glass tubing is to be shrunk. Ultrasonic drilling is also unsatisfactory because of difficulty in getting sufficiently small and regular openings. Such holes may be provided, however, by a further teaching of the invention. Stainless base material is drilled to the appropriate size, e.g. .028 inch in diameter. Iron wire is fit tightly into these drill holes and left in place during a subsequent spray application of the hard surfacing material and machining. The end of the iron wire will then be exposed and may be drilled out to provide an even regular hole through the hard surface.

In the operation of the apparatus, a tube blank 45 is mounted on the mandrel and positioned so that it extends axially in both directions from the passageways 20 as is shown in the drawing in FIG. 1. The tubing length or blank 45 may be held in position on the mandrel in any convenient manner such as by the provision of a loosely fitting collar resting around the shaft 21 and supported on lock nut 26 or by a finger-arm support (not shown). It will be understood that with the tubing length so supported its ends are located on opposite sides of the passageways 20. The mandrel and the tube blank are rotated and a flame from preheater 31, having fuel connection 43 and supported by bracket 42, is played on the rotating tube blank, the flame extending over the length of the blank.

A vacuum is then applied to the system through the bored mandrel and the passageways 20 to cause air to move past the inner circumference of the glass tube and between the glass tube and the mandrel. This has the effect of reducing the absolute pressure within the area between the tube and mandrel to something less than atmospheric thereby creating a pressure differential between the outside of the tube and the inside of the tube tending to collapse it.

End seals are then formed between the tubing and the mandrel adjacent each end of the tubing length. These seals are in the form of beads 50 and 51. They are formed by heating a ring area of the tubing length adjacent to each of its ends by fixed position gas burners 32 and 33. These burners are adapted to heat the narrow ring of glass tubing to a temperature substantially above its softening point, the softening point being taken as the temperature a uniform fiber, .5 to 1.0 mm. in diameter and 22.9 cm. in length, elongates under its own weight at a rate of 1 mm. per minute when the upper 10 cm. of its length is heated in a prescribed furnace at the rate of approximately 5° C. per minute. As a result of the positioning of the length of tubing, the seals which are formed adjacent to each of its ends are on opposite sides of the passageways 20.

Air continues to be evaluated through the vacuum system after the seals are formed to provide a partial evacuation of the area between tubing and mandrel in the length between the seals 50 and 51. This evacuation will produce a substantially greater pressure differential between the inside and the outside of the length of tubing tending to cause it to collapse against the mandrel than was achieved by the passage of moving air between the length of tubing and the mandrel.

The length of tubing intermediate the seals is then progressively moved toward the mandrel in the following manner. Traveling or movable burners 34 and 35 are connected to gas and air lines 52 and 53 respectively. These burners are mounted on means for moving them along and adjacent to the tubing length between the seals. These means may comprise pneumatic cylinders 36 and 37 and may move the burners 34 and 35 axially of the mandrel 15 from the position indicated in full lines in FIG. 1 to the position indicated in phantom. A traveling or movable burner 34 and 35 play a glass softening flame on the rotating glass tube and are simultaneously and progressively advanced along the tube from, in this example, the circumferential seal 51 to adjacent the radial passageways 20. The speed of movement is adjusted so that the glass in the vicinity of the softening flame is heated to about the softening point of the glass of which the tube is made and, in any event, this softening temperature may be substantially less than the temperature to which the glass is heated by the burners 32 and 33 to form the narrow end seals. As the flames are advanced, the softened glass in consequence of the pressure differential across the tube wall moves into and against the mandrel under a viscous flow. The condition of the tube, after the softening flames have advanced a short distance towards the passageways 20, is indicated in FIG. 7.

The present invention includes the discovery that, while it may be necessary to form end seals at a temperature approaching or approximately the working temperature of a glass, the subsequent shrinking can be carried out at a lower temperature to achieve a better shrunk surface.

The travel of the softening burners 34 and 35 may be terminated a short distance from the radial passageways 20 or may be continued right up the passageways 20. If terminated just before or at the passageways, the tube will have the appearance and form indicated in FIG. 8. That is, the bulge that characteristically precedes the traveling flame will be left standing over the openings 20 at shown in that figure.

Alternatively, the travel of the softening burners 34 and 35 may be continued beyond the passageways 20, as would be the case if a second series of passageways were provided beyond the first so as to continue to provide a vacuum after the first set of passageways 20 was closed. In this case, the glass in the vicinity of the passageways is fully heated to approximately its softening point and the bulge moves past the first set of passageways.

The bulge 58 may be collapsed over the set of passageways if two burners are traveled along the glass tube to meet adjacently over a set of passageways. When the bulge traveling ahead of each burner meets over the passageway and the glass forming the bulge is heated to its working softening point, the bulge collapses and it has been found that the inner surface of the collapsed bulge is a perfectly uniform part of the shrunk tubing. On the outside of the tube, however, the excess glass from the bulge results in a slight thickening and discontinuity. In practice, this irregularity is usually so small that it is not readily noticeable either by visual inspection or by running a finger over it and its presence along the outside of the tubing is not a serious disadvantage to its subsequent use in syringe manufacture.

The application of this alternative technique in which the travel of the softening burners such as 34 and 35 may be paired toward each other to collapse the bulge formed ahead of the burners in the vicinity of the passageways 20 is shown in FIG. 12. A length of tubing 45a is positioned about the mandrel 15a. The mandrel is provided with a bore 16a connecting with openings and air passageways 20. These passageways are spaced in sets or areas at convenient intervals along the mandrel. A tapered end portion 22a is mounted in a flared portion of bore 49a in shaft 21c that is supported and rotated as shaft 21, described supra, and the bore of which is connected to an air-evacuating means. The evacuation of air causes movement of air between the length of tubing 45a and the mandrel 15a and a small pressure differential between the inside and the outside of the tubing. The mandrel may be mounted in a vertical position and the tubing supported about it on a ring element 72 that fits loosely about the mandrel and is supported by a shoulder 21b on the shaft 21c. This ring portion may preferably be provided with slots 73 or equivalent means in the portion adjacent the end of the tubing length so as to permit the free entry of air to and between the tubing length and the mandrel.

Fixed jet burners shown at 32a and 33a direct a flame to a narrow ring or short axially extending section of the rotating tube blank at locations adjacent to the bottom and top of the tubing length respectively. Flame is applied to heat the narrow ring section to a temperature substantially above its softening point so that viscous flow will occur and the ring section will move in against the mandrel to form a seal as is shown by an insert in FIG. 12 at 50a.

After the seals are formed, and air removed from between the mandrel and the tube in the area between the seals, traveling flames or movable burners 34a, 34b, 34c, 34d and 34e are operated to progressively heat the tubing to approximately its softening point where it will be urged by a pressure differential between the outside atmospheric pressure and the inside lessened pressure to move in and collapse against the tube. These burners may be mounted and moved according to the teaching for burners 34, 35, supra or any other convenient means. It is important only that they commence their travel at a location spaced from one series of radially extending passageways 20 and progressively move toward the passageways at a rate such that the glass of the tubing over which they may pass is brought to the appropriate softening temperature. Preferably a pair of burners is positioned on opposite sides of one set of the passageways 20 and each moved toward the other so as to meet at the passageways 20 as shown in phantom for burners 34a and 34b in FIG. 12. The bulges that form ahead of the burners will collapse leaving a slight barely visible irregularity at location 100. Preferably, the glass forming the inner surface of the bulge over the passageways 20 should be heated only enough to permit its collapse onto the mandrel in the area of the passageways and the vacuum being directly applied to this surface through the passageways should then be immediately released so as to prevent creep of the collapsed glass surface into the passageways. In practice, it has been found that what small deformations into the passageways may occur are reabsorbed into the general regular inner surface of the shrunk tube if the vacuum is quickly released without waiting for any cooling to take place.

After the glass tubing to be shrunk has been collapsed against the mandrel and, according to a preferable further teaching of the invention, after the vacuum has been released, the softening flames are extinguished and the mandrel and glass combination allowed to cool. Since the metallic mandrel has a higher co-efficient of thermal expansion than the borosilicate glass used for medical work, the mandrel will contract and separate away from its intimate contact with the inner surface of the glass.

If the fixed burners 32a and 33a are adjusted so that they heat the exact end of each length of tubing, the seal will be formed out of the glass at the extreme end and the tubing may be accurately dimensioned throughout its entire length. If the fixed burners are not adjusted in position for a number of pieces of tubing which may vary somewhat in their lengths, there will usually be a short portion 57a left unshrunk around the tubing portion spaced on the opposite side of the seal 50a from the passageways 20. This portion may be used for subsequent manufacture of the syringe tip portion or in some other manufacturing operation or it may simply be cut off and discarded.

If the invention is practiced as described for the FIG. 1 apparatus, the resulting product will appear as shown in FIG. 9. It should be understood that, even with the section 1 apparatus, the length of tubing 57 may be shrunk by also raising the burners 34 and 35 to adjacent the seal 50 and moving them slowly downward with a slight dwell at the bulge 58 to cause it to collapse against the openings 20. The mandrel shown in FIG. 12, of course, and the operation described in connection with that figure, are especially conceived to produce a long uniformly dimensioned piece of tubing with only a small portion such as 57a left unshrunk on the outside of the seal 50a.

When the invention is practiced with an alkali-resistant, noncorrosive borosilicate glass such as used in syringe manufacture, it has been found that the shrinking operation increases the number and size of the small microscopic surface imperfections found along the bore of clear glass as it is drawn by presently known techniques. The applicant does not know why this is so. At present it is thought that the clear glass may wet the mandrel surface when it is softened sufficiently to flow into contact with the mandrel and act as a powerful solvent even for stainless steel and the hard-surfacing metals which may be used to coat the mandrel surface. The metal which is dissolved may then oxidize or otherwise react with the glass surface to cause or increase blow-outs or imperfections. Alternatively, it may be that the clear glass simply sticks to the mandrel when it is shrunk into an intimate relation with the mandrel surface and that as the mandrel cools shrinks and pulls away from the glass, microscopic portions of the glass surface remain on the mandrel. Possibly also, there is gas occluded within the tubing length which is evolved during the heating with consequent damage to the inner surface. It has been found that this source of imperfection in the shrinking technique may be reduced if the inner surface of the clear-glass tubing is abraded before it is shrunk. Preferably this abrading can be done by dispersing abrasive particles in an air blast directed into one end of the glass tubing adjacent to the surface at a slight angle from the longitudinal axis of the tubing so that the particles swirl circularly through the tubing bore rubbing and tumbling over the surface throughout its entire length.

The improvement in respect to syringe quality realized by employing tube blanks abraded on the inside surface thereof is indicated by FIG. 5 and FIG. 10, which depict the inside surface of the glass before and after the shrinking operation, as viewed through a microscope at high magnification and focused on the inside surface of the glass. In FIG. 5, the inside surface 66 has a frosted appearance indicated by the marks 67, and there are irregularities 68. These irregularities are less in number and size than is the case for an unabraded preform since the abrading reduces irregularities. After the shrinking, as is indicated in FIG. 10, the inside surface still has frosted appearance. The irregularities are reduced by the shrinking treatment and hence the irregularities $68^1$ (FIG. 10) are smaller and fewer in number than is the case for the abraded tube preform.

Whereas the invention has been described for shrinking with reference to a borosilicate glass, any inorganic glasses or a material other than glass having the properties of glass on which operation of the invention depends, can be employed.

It will be apparent that the method of the invention can be applied to make tubular pieces having a finished section of indefinite length and need not be carried out so that the length of the tube blank is the length required for a single syringe barrel.

Also, the invention could be employed to produce products other than syringe barrels. Thus it could be employed to produce articles having a section—which need not be cylindrical and can be tapered and/or have a cross-section other than circular—formed to accurate inside dimension by shrinking, and another section formed by working a portion of the material not accurately dimensioned by shrinking.

It can be seen that by practicing one embodiment of the invention to produce syringe barrels a tubing blank is moved in against and shrunk to the mandrel 15 by progressively advancing a softening flame from one of the circumferential seals to adjacent the mandrel radial passageways. There is obtained a tubular piece having a finished section 56 extending from adjacent the flanged end of the piece to the position at which axial movement of the softening flame was terminated and the inside diameter of this section will be accurate to the extent possible by use of the glass shrinking technique, and an unfinished section 57 extending from the finished section to the end of the piece remote from the flange 55, and of inside diameter of substantially less accuracy than that of the finished section. Characteristically, there is a bulge 58 in the unfinished section where it meets the finished section, this bulge resulting from the manner in which the tube preform was treated to obtain the tube piece having the finished section 56. Another characteristic of the tube pieces having a finished section and an unfinished section is a bead 50 disposed about the inside surface of the unfinished section and being the result of the circumferential seal formed in the unfinished section to obtain the vacuum for the shrinking operation. Thus, the unfinished section 57, except for the bulge 58 and the bead 50 has an accuracy in inside dimension equal to that of the nominal diameter of the tube blank employed.

The tube blank is provided with an end flange 55 as is suitable for the flange commonly provided at the plunger entering end of syringe barrels.

The tubular piece including the finished section 56 and unfinished section 57 can be worked in a known manner to provide the syringe needle mounting tip 58, as is depicted in FIG. 11. The unfinished section 57, which includes the bulge 58, can be worked by forming rolls (not shown) at an elevated temperature at which it is suitably fluid, to form the unfinished section, or a portion thereof commencing at the finished section into the needle mounting tip including end wall 60, and nozzle 61. A syringe discharge passageway 62 extending through the nozzle can be made in a known manner. A metal fitting 63 is then placed on the tip 58 by securing it thereto with adhesive 64 and with the aid of a jig to accurately position the fitting on the tip. The fitting 63 is provided with screw threads 65 for use in threading a needle onto the syringe barrel in a known manner. Graduation markings can be applied to the syringe barrel in known manner.

As is indicated in FIG. 11, the cylindrical portion 70 of the syringe barrel is without any bulge adjacent the needle mounting tip 58. The inside diameter is of accuracy obtainable by shrinking, and the outside diameter is substantially uniform up to the needle mounting tip.

The glasses typically supplied and used for syringe manufacture have a viscosity that increases with heat. By common definition and as supplied by the manufacturers of syringe tubing, each glass is assigned a working point or temperature which is the temperature at which the glass is soft enough for hot working by most of the common methods. The viscosity of the glass at this working point is usually in the neighborhood of $10^4$ poises.

The softening point and the working point or temperatures are frequently given by glass manufacturers as a precise number of degrees. It should be understood that these terms are used here to refer to glass temperatures in the general vicinity of these precise temperatures and closer to them than to other common reference temperatures. It should be understood that since the viscosity of glass gradually changes with temperature, the temperatures at which a process can be carried out vary somewhat depending on how fast it must be carried out. The terms softening and working temperatures are used in the appended claims to explain what is claimed as the method of the present invention and will be readily understood by those skilled in what may truly be called the art of glass forming.

I claim:

1. A method for shrinking a glass tube having two open ends on a mandrel that comprises the steps of placing the glass tube on a mandrel whose ends extend beyond the ends of said tube and which has passageways connecting with the surface thereof at a position intermediate the ends thereof, heating a narrow circumference of said glass tube adjacent to each of its ends to a temperature permitting viscous glass flow and continuing said heating until said tubing circumference portions at each end collapse into sealing contact with the mandrel, removing air from between the glass tube and the mandrel in the area between the points of sealing contact through said passageways to cause a pressure differential between the outside and the inside of said tube and progressively heating said glass tube from a point adjacent at least one of said points of sealing contact toward said passageways to cause said tube to progressively collapse and be accurately sized against said mandrel.

2. A method for shrinking a glass tube having two open ends on a mandrel that comprises the steps of placing the glass tube on a mandrel whose ends extend beyond the ends of said tube and which has passageways communicating with the surface thereof at a position intermediate the ends thereof, moving air past the inner circumference of the glass tube adjacent to each of its ends so as to reduce the absolute pressure exerted by the air against the said inner circumferences, heating a narrow circumference of said glass tube adjacent to each of its ends to a temperature substantially above its softening point while moving said air to reduce said absolute pressure and continuing said heating until said tubing circumference portions at each end collapse into sealing contact with the mandrel, removing air from between the glass tube and the mandrel in the area between the points of sealing contact through said passageways so as to cause a pressure differential betweent the outside and the inside of said tube and progressively heating said glass tube from a point adjacent at least one of said points of sealing contact toward said passageways to cause said tube to progressively collapse and be accurately sized against said mandrel.

3. The method of accurately sizing glass tubing on a mandrel that comprises the steps of positioning a length of glass tubing having open ends on an axially bored mandrel whose ends extend beyond the ends of said tube and having radial passages intermediate its ends extending from the bore to the outer surface of the mandrel for the removal of air therefrom, heating a ring area around the glass tubing adjacent to each of its open ends to a temperature of viscous flow so as to cause said tubing to collapse about and to form sealing contact with said mandrel in the area of said rings, removing air through said passageways and from between said length of tubing and said mandrel in the area between the points of sealing contact, progressively heating the length of glass tubing from a point adjacent at least one of said points of sealing contact toward said passageways to the softening point of said tubing so as to cause it to be progressively collapsed and sized against said mandrel.

4. The method of accurately sizing glass tubing on a mandrel that comprises the steps of positioning a length of glass tubing open at each end on an axially bored mandrel whose ends extend beyond the ends of said tube and having passageways extending from and between the bore to the outer surface of the mandrel at a position intermediate the ends of said tube, rotating said tubing and said mandrel together, positioning a burner along said outer surface adjacent to each end thereof and operating said burner so as to heat a short axially extending circumferential ring area about the glass tubing adjacent to each to its open ends to a temperature of viscous flow until said tubing collapses about said mandrel in the area of said rings into sealing contact with said mandrel adjacent to each of said tubing ends, evacuating air from between said tubing and said mandrel in the area between the points of sealing contact through said passageways, positioning at least one traveling burner along said outer surface of said tubing adjacent to one of said points of sealing contact and operating said traveling burner so as to progressively heat the glass from said point of sealing contact toward said passageways to cause the tubing to progressively collapse against the mandrel.

5. The method of accurately sizing glass tubing on a mandrel that comprises the steps of positioning a length of glass tubing open at each end on an axially bored mandrel whose ends extend beyond the ends of said tube and having passageways intermediate the ends thereof extending from and between the bore to the outer surface of the mandrel for the removal of air therethrough, rotating said tubing and said mandrel together, removing air through said passages so as to move air between said tubing and said mandrel, positioning a burner along said outer surface adjacent to each end thereof and operating said burner so as to heat a short axially extending circumferential ring area about the glass tubing adjacent to each of its open ends to a temperature of viscous flow until said tubing collapses about and into sealing contact with said mandrel in the area of said rings adjacent to each of said tubing ends, evacuating air from between said tubing and said mandrel in the area between the points of sealing contact through said passageways, positioning at least one traveling burner along said outer surface of said tubing adjacent to one of said points of sealing contact and operating said traveling burner so as to progressively heat the glass to cause the tubing to progressively collapse against the mandrel while progressively moving said traveling burner toward said passageways.

6. The method of accurately shrinking a glass tube to size it about a mandrel that comprises the steps of positioning a length of glass tubing having each of its two ends open on an axially bored mandrel having at least one series of passages in an approximate cross-section to the mandrel axis and extending from the bore of the mandrel to the outer surface thereof and disposed intermediate the ends of said mandrel for the removal of air, rotating said tubing and said mandrel together, positioning a burner adjacent to each of said tubing ends and operating said burner to heat a narrow circumference of the glass tube to a temperature permitting viscous gas flow and continuing said heat until said narrow circumference portions at each end collapse into sealing contact with the mandrel, evacuating air from between said tubing and said mandrel so as to cause a pressure differential between the outside and inside of said tubing and the area between the points of sealing contact, positioning a pair of softening burners along the outer circumference of said glass tubing, spaced apart on opposite sides of said passages and progressively moving said softening burners from said spaced positions toward said passages to progressively heat the glass tubing and cause it to progressively collapse about said mandrel in response to said pressure differential between the outside and inside of said tubing until said burners meet closely to one another adjacent opposite sides of said passages so as to heat the glass between them and cause it as well as the glass over which each burner has passed to collapse against and be sized by the mandrel.

7. The method of accurately dimensioning glass tubing that comprises placing and positioning a length of glass tubing on a mandrel whose ends extend beyond the ends of said tube and which has passageways communicating with the surface thereof having openings not greater than about 0.028 inch at a position intermediate the ends thereof, heating a short axially extending ring section of said tubing adjacent to each of its ends to cause said tubing to collapse about and to form sealing contact with said mandrel at the tubing ends, evacuating air from between the tubing and the mandrel in the area between the points of sealing contact through said openings, progressively heating the tube from adjacent to one of said points of sealing contact toward and over said passages so as to cause the tubing surface to progressively collapse about and on the mandrel in the area between the points of sealing contact and said passageways and in the area about said passageways, and thereafter releasing said vacuum while said tube is still heated so as to allow the glass deformed from the inner tube surface into said small passageways to be reabsorbed into the general inner tubing surface.

8. The process for shrinking a length of clear drawn glass tubing having the small microscopic surface imperfections along its inner surface from the present glass drawing practices to provide an accurately dimensioned inner surface with a minimum of surface imperfections that comprises the steps of abrading the inner surface of clear drawn glass tubing for a period of time sufficient to provide a matt surface characterized in that many of the small microscopic surface imperfections remain, placing the abraded tubing on a mandrel whose ends extend beyond the ends of said tube and which has passageways communicating with the surface thereof at a position intermediate to ends thereof and supporting it in that position, heating a narrow ring portion of the glass tubing adjacent to each of its ends to a temperature substantially above its softening point so as to cause the glass forming the narrow ring areas to collapse into sealing contact with the mandrel surface, evacuating the space between the mandrel and the abraded length of the tubing in the area between the points of sealing contact through said passageways to provide a pressure differential between the outside and the inside of the tubing, progressively heating the glass from adjacent to one of said points of sealing contact along the axis of the tubing in a direction toward the other of said points of sealing contact so as to cause said tubing to progressively collapse against and to an intimate relation with the mandrel surface so as to take on the exact size and dimensions of the mandrel, moving air into the space between the glass tubing and mandrel in the area between the points of sealing contact so as to release the vacuum, cooling the glass tubing and mandrel so as to cause the mandrel to separate and pull away from the inner surface of the abraded glass tubing whereby an accurately sized inner surface is produced in the glass characterized in that the small microscopic surface imperfections left after the abrading are lessened as a result of the shrinking portion of the process.

References Cited
UNITED STATES PATENTS

| | | | |
|---|---|---|---|
| 1,499,309 | 6/1924 | Ramsey | 76—107 |
| 1,654,936 | 1/1928 | Jones | 76—107 |
| 2,470,234 | 5/1949 | Brewer | 65—282 X |
| 2,684,556 | 7/1954 | Molinari | 65—110 |
| 2,771,710 | 11/1956 | Molinari et al. | 65—110 |

DONALL H. SYLVESTER, *Primary Examiner.*

D. CRUPAIN, A. D. KELLOGG, *Assistant Examiners.*

UNITED STATES PATENT OFFICE
CERTIFICATE OF CORRECTION

Patent No. 3,332,764                                               July 25, 1967

James J. Knox

It is certified that error appears in the above identified patent and that said Letters Patent are hereby corrected as shown below:

Column 3, line 24, "on" should read -- at --. Column 5, line 59, "evaluated" should read -- evacuated --. Column 6, line 33, "at" should read -- as --. Column 10, line 39, "betweent" should read -- between --.

Signed and sealed this 5th day of August 1969.

(SEAL)
Attest:

Edward M. Fletcher, Jr.                              WILLIAM E. SCHUYLER, JR.
Attesting Officer                                            Commissioner of Patents